(12) United States Patent
Taylor

(10) Patent No.: US 7,429,365 B2
(45) Date of Patent: *Sep. 30, 2008

(54) METHOD AND SYSTEM FOR REMOVING MERCURY FROM COMBUSTION GAS

(75) Inventor: Robert W. Taylor, Overland Park, KS (US)

(73) Assignee: General Electric Company, Schenectady, NY (US)

( * ) Notice: Subject to any disclaimer, the term of this patent is extended or adjusted under 35 U.S.C. 154(b) by 351 days.

This patent is subject to a terminal disclaimer.

(21) Appl. No.: 11/282,324

(22) Filed: Nov. 18, 2005

(65) Prior Publication Data

US 2007/0116616 A1 May 24, 2007

(51) Int. Cl.
*B01D 46/00* (2006.01)
*B01D 53/64* (2006.01)
*B01D 53/74* (2006.01)
*B01D 53/76* (2006.01)

(52) U.S. Cl. .............. 423/210; 423/215.5; 423/DIG. 5; 422/105; 422/111; 422/168; 422/169; 422/170; 422/171; 422/172; 422/176

(58) Field of Classification Search .................. 423/210, 423/215.5, DIG. 5; 422/111, 168, 169, 170, 422/171, 172, 176, 105
See application file for complete search history.

(56) References Cited

U.S. PATENT DOCUMENTS

| | | | |
|---|---|---|---|
| 4,273,747 A | 6/1981 | Rasmussen | |
| 5,456,891 A | 10/1995 | Fattinger et al. | |
| 5,507,238 A | 4/1996 | Knowles | |
| 5,569,436 A | 10/1996 | Lerner | |
| 5,672,323 A | 9/1997 | Bhat et al. | |
| 5,827,352 A | 10/1998 | Altman et al. | |
| 6,136,281 A | 10/2000 | Meischen et al. | |
| 6,284,199 B1 | 9/2001 | Downs et al. | |
| 6,375,909 B1 | 4/2002 | Dangtran et al. | |
| 6,439,138 B1 | 8/2002 | Teller et al. | |
| 6,503,470 B1 | 1/2003 | Nolan et al. | |
| 6,524,371 B2 | 2/2003 | El-Shoubary et al. | |
| 6,528,030 B2 | 3/2003 | Madden et al. | |
| 6,533,842 B1 | 3/2003 | Maes et al. | |
| 6,534,024 B2 | 3/2003 | Honjo et al. | |
| 2001/0007647 A1 | 7/2001 | Honjo et al. | |
| 2002/0117094 A1 | 8/2002 | Teller et al. | |
| 2003/0047440 A1 | 3/2003 | Granite et al. | |
| 2005/0214187 A1* | 9/2005 | Johnson | 423/235 |
| 2006/0120934 A1 | 6/2006 | Lanier et al. | |
| 2006/0239877 A1* | 10/2006 | Johnson et al. | 423/210 |
| 2007/0154374 A1* | 7/2007 | Johnson et al. | 423/210 |
| 2008/0011158 A1 | 1/2008 | Barger et al. | |

* cited by examiner

*Primary Examiner*—Timothy C Vanoy
(74) *Attorney, Agent, or Firm*—Greg Strugalski, Esq.; Armstrong Teasdale LLP

(57) ABSTRACT

A method for continuously removing mercury from a supply of combustion gas is provided. The method includes introducing $SO_3$ into the supply of combustion gas to oxidize at least a portion of elemental mercury within the supply of combustion gas into ionic mercury. A turbulent flow of combustion gas is produced to suspend particulate matter including fly ash contained in the supply of combustion gas. A substantial portion of the mercury is absorbed within the particulate matter. The supply of combustion gas is filtered to remove the particulate matter from the mercury. The introduction of $SO_3$ into the combustion gas is controlled based at least partially on at least one of an oxidation rate of mercury and an absorption rate of mercury.

14 Claims, 2 Drawing Sheets

METHOD AND SYSTEM FOR REMOVING MERCURY FROM COMBUSTION GAS

BACKGROUND OF THE INVENTION

This invention relates generally to a system and method for removing toxic compounds from combustion gases and, more particularly, to a system and method for continuously removing mercury from a supply of combustion gas.

During a typical combustion process within a furnace or boiler, for example, a combustion gas is produced. The combustion gas contains combustion products including, without limitation, carbon monoxide, water, hydrogen, nitrogen and mercury as a direct result of combusting solid and/or liquid fuels. Before the combustion gas can be exhausted into the atmosphere, any hazardous or toxic combustion products, such as mercury, must be sufficiently removed according to governmental and/or environmental standards and procedures.

Conventional methods of removing mercury from combustion gases include injecting activated carbon into the combustion gas as the combustion gas is directed through duct work. With such conventional methods, it is difficult to obtain uniform distribution of the particulate matter within the duct work. As a result of poor mixing and/or carbon fallout, mercury is not efficiently removed from the combustion gas. In an attempt to solve such problems, an injection rate of activated carbon is increased, which further exacerbates the problems associated with the conventional methods.

BRIEF DESCRIPTION OF THE INVENTION

In one aspect, the present invention provides a method for continuously removing mercury from a supply of combustion gas. The method includes introducing $SO_3$ into the supply of combustion gas to oxidize at least a portion of elemental mercury within the supply of combustion gas into ionic mercury. A turbulent flow of combustion gas is produced to suspend particulate matter including fly ash contained in the supply of combustion gas. A substantial portion of the mercury is absorbed within the particulate matter. The supply of combustion gas is filtered to remove the particulate matter from the mercury. The introduction of $SO_3$ into the combustion gas is controlled based at least partially on at least one of an oxidation rate of mercury and an absorption rate of mercury.

In another aspect, a control system for controlling a continuous removal of mercury from a supply of combustion gas is provided. The control system configured to adjust an injection rate of $SO_3$ into the supply of combustion gas to oxidize at least a portion of elemental mercury within the supply of combustion gas into ionic mercury based on an absorption rate of mercury by a particulate matter suspended in the combustion gas.

In another aspect, the present invention provides a system for continuously removing mercury from a supply of combustion gas. The system includes a combustion gas conditioning system introducing a quantity of $SO_3$ into the supply of combustion gas. An electrostatic precipitator is in communication with the combustion gas conditioning system. The electrostatic precipitator adjusts an emission of fly ash from the electrostatic precipitator to control a quantity of mercury absorption sites available downstream. A cooling device is in communication with the electrostatic precipitator. The cooling device cools the supply of combustion gas as the supply of combustion gas flows through the cooling device. A section of the system produces a turbulent flow of combustion gas. An injector controllably injects a quantity of external sorbent into the turbulent flow of combustion gas. The turbulent flow of combustion gas uniformly distributes a particulate matter including the quantity of sorbent. An electrostatic fabric filter is positioned downstream of the injector. The electrostatic fabric filter filters the particulate matter removed from the turbulent flow of combustion gas and removes the particulate matter and the quantity of sorbent from a quantity of mercury absorbed in the quantity of sorbent. A recirculating device provides communication between the electrostatic fabric filter and the injector. The recirculating device circulates the filtered particulate matter into the injector.

DETAILED DESCRIPTION OF THE INVENTION

The present invention provides a method and system for continuously removing hazardous and/or toxic compounds, such as mercury vapor, from combustion gas produced during a combustion process within a furnace or boiler, for example. Combustion gas having combustion products including, without limitation, carbon monoxide, water, hydrogen, nitrogen and mercury is a direct result of combusting solid and/or liquid fuels. Before the combustion gas can be exhausted into the atmosphere, any toxic combustion products, such as mercury, must be sufficiently removed according to governmental and/or environmental standards and procedures.

The present invention is described below in reference to its application in connection with and operation of a system for continuously removing mercury from a supply of combustion gas generated during a combustion process. However, it will be obvious to those skilled in the art and guided by the teachings herein provided that the invention is likewise applicable to any combustion device including, without limitation, boilers and heaters, and may be applied to systems consuming fuel, coal, oil or any solid, liquid or gaseous fuel.

As used herein, references to "particulate matter" are to be understood to refer to particulate matter contained within the combustion gas. The particulate matter includes particles of matter including, without limitation, fly ash and carbon, contained within the combustion gas as a naturally occurring product of a combustion process, and may also include externally-introduced matter including, without limitation, at least one sorbent and/or additional fly ash, recirculated or injected into the particulate matter contained within the combustion gas.

In one embodiment, a system 10 for continuously removing mercury from a supply of combustion gas is provided. The combustion gas is produced during a combustion process in which a solid or liquid fuel source is ignited within a furnace or boiler. The combustion process generates toxic mercury in the form of mercury vapor as a combustion product, which must be satisfactorily removed before the combustion gas can be exhausted into the atmosphere.

Figure 1:
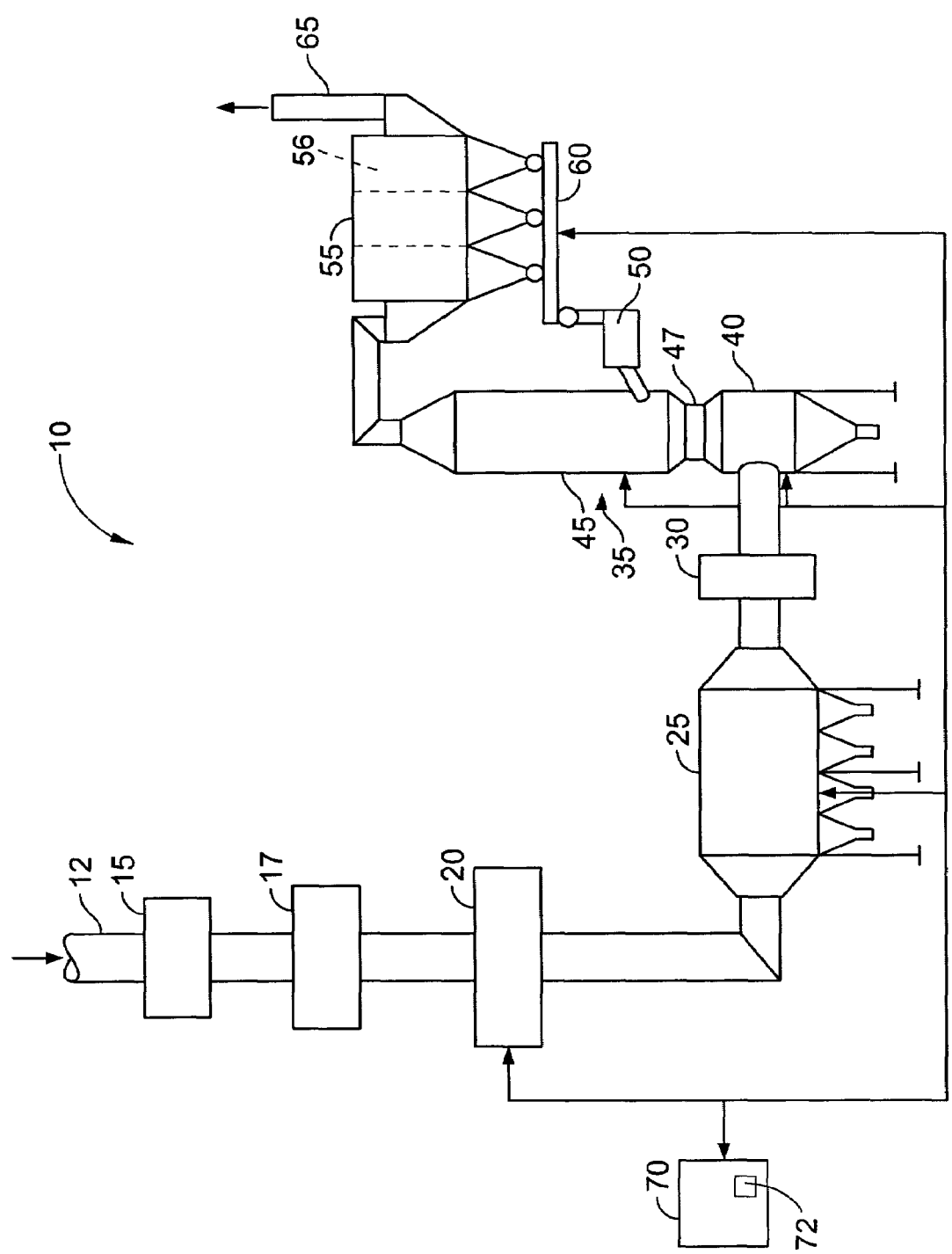
FIG. 1 is a schematic view of a system for removing mercury from a supply of combustion gas, according to one embodiment of this invention.

FIG. 1 schematically shows system 10 for continuously removing mercury from a supply of combustion gas. A supply of combustion gas produced during a combustion process is directed through system 10. System 10 includes a pipe 12 or other suitable connection for directing the combustion gas through system 10. Pipe 12 generally provides communication between components of system 10 through a passage in which the combustion gas is directed to flow. It is apparent to those skilled in the art and guided by the teachings herein provided that pipe 12 may have any suitable size, shape and/or diameter to accommodate any supply of combustion gas produced during the described combustion process.

In one embodiment, the combustion gas is directed through a selective catalyst reduction device ("SCR") 15 to reduce $NO_X$ contained in the combustion gas. Within SCR 15, $NO_X$ is reduced to nitrogen and oxygen. In one embodiment, a suitable quantity of ammonia is injected into the combustion gas before or as the combustion gas enters SCR 15. The injected ammonia facilitates the conversion of $NO_X$ to nitrogen and oxygen. In this embodiment, SCR 15 includes a plurality of plates parallel with a direction of flow of the combustion gas. Each plate is coated or lined with a catalyst suitable for catalyzing the reduction of $NO_X$ as the combustion gas flows across the surface area of the plates. The plates are fabricated from an extruded ceramic material and coated with a suitable catalyst material known to those skilled in the art. In alternative embodiments, SCR 15 includes plates fabricated from any suitable material and/or having any suitable configuration known to those skilled in the art.

In one embodiment, an air heater 17 is positioned downstream from and in communication with SCR 15. Air heater 17 extracts heat from the combustion gas as the combustion gas flows through air heater 17 and/or pipe 12. The combustion gas enters air heater 17 at a temperature that approaches or is greater than about 750° F., and exits air heater 17 at a temperature desirably less than about 300° F.

As shown in FIG. 1, system 10 includes a combustion gas conditioning system 20. In one embodiment, as the combustion gas is directed through combustion gas conditioning system 20 and/or pipe 12, a controllable quantity of $SO_2$ is injected into pipe 12 to interact with the combustion gas flowing through pipe 12. In a particular embodiment, a supply of sulfur is burned within combustion gas conditioning system 20 to produce $SO_2$ that is injected into pipe 12. Upon injection into pipe 12, $SO_2$ is quickly converted into $SO_3$ and further into $H_2SO_4$ downstream. Alternatively, or in addition, a quantity of $SO_3$ is introduced into the supply of combustion gas as a function of a slipstream present in SCR 15. The presence of $SO_3$ in the supply of combustion gas increases the oxidation rate of elemental mercury to ionic mercury. In the ionic form, mercury is more readily collectable than elemental mercury, and is also water soluble. System 10 controls and/or adjusts the introduction of $SO_3$ into the combustion gas based on an absorption rate of mercury within a downstream positioned reactor tower and/or electrostatic fabric filter, discussed below.

In one embodiment, an electrostatic precipitator ("ESP") 25 is positioned downstream of combustion gas conditioning system 20. The conditioned combustion gas enters ESP 25. Within ESP 25, a portion of a particulate matter contained within the combustion gas is removed or precipitated out of the combustion gas as the combustion gas is directed through ESP 25. A moderate quantity of particulate-bonded mercury, e.g., liquid phase mercury absorbed by the particulate matter, is removed with the particulate matter. However, elemental mercury and ionic mercury in a gas phase, e.g., mercury vapor, remains in the combustion gas upon exiting ESP 25. In one embodiment, the particulate matter includes fly ash produced as a natural product of the combustion process that has not been contaminated with sorbents, which are introduced into the combustion gas downstream. In one embodiment, the uncontaminated fly ash is collected for injection into system 10 downstream or for use and/or sale for other purposes.

System 10 further includes a cooling device 30 in communication with pipe 12 downstream from ESP 25. Cooling device 30 cools the combustion gas to a suitable temperature, desirably at least about 260° F. and within a range of about 260° F. to about 300° F. In one embodiment, cooling device 30 includes an evaporator that injects atomized water into the combustion gas as the combustion gas is directed through pipe 12. The water is atomized using any suitable process known to those having ordinary skill in the art, such as a pneumatic or a hydraulic process. In this embodiment, system 10 controls the temperature of the combustion gas exiting cooling device 30 through the introduction of atomized water.

In one embodiment, system 10 includes a reactor tower 35 positioned downstream from ESP 25, as shown in FIG. 1. Reactor tower 35 includes a venturi section 40 connected to and in communication with a chamber 45 formed in an upper portion of reactor tower 35. The combustion gas is directed through cooling device 30 and into venturi section 40 to increase the absorption properties of the particulate matter contained within the combustion gas. Venturi section 40 creates a fluidized bed to suspend particulate matter within chamber 45. A velocity of the combustion gas at a throat 47 formed at a connection between venturi section 40 and chamber 45 is greater than a velocity of the combustion gas within chamber 45, thus creating a turbulent flow of combustion gas within chamber 45. The increased velocity at throat 47 prevents heavier particulate matter from collecting and/or agglomerating at a throat area, and forces the particulate matter into chamber 45 to create a generally uniform suspension and/or distribution of particulate matter within chamber 45. The suspended particulate matter within chamber 45 provides an increase in particulate matter surface area suitable for mass transfer.

In one embodiment, with the particulate matter suspended uniformly throughout chamber 45, at least one sorbent is injected into chamber 45 through injector 50. In this embodiment, the sorbent is contained within an externally-introduced or recirculated supply of particulate matter. Injector 50 includes an external sorbent feed system, such as a gravity fed conveyor system or an inductor, in communication with chamber 45 that injects the particulate matter into chamber 45. In this embodiment, at least a portion of the particulate matter includes recirculated particulate matter including a quantity of recycled sorbent, such as activated carbon, fly ash and/or lime. Other suitable sorbents known to those skilled in the art and guided by the teachings herein provided may be included in the particulate matter injected into chamber 45. The use of recycled sorbent decreases the requirement for expensive, externally-introduced sorbents, and increases the mercury removal efficiency of system 10. In alternative embodiments, externally-introduced sorbents may not be required if the particulate matter is efficiently removing mercury. The mercury contained within the combustion gas is absorbed and/or bonded to the particulate matter and, more specifically, the sorbent contained within the particulate matter. While reactor tower 35 is shown by way of example, it will be apparent to those skilled in the art and guided by the teachings herein provided that the turbulent flow of the combustion gas and/or the introduction of the sorbent can be accomplished anywhere in the system downstream from ESP 25. In one embodiment, the turbulent flow of the combustion gas and/or the introduction of the sorbent is accomplished within pipe 12 and/or a suitable ducting system positioned downstream from and in communication with ESP 25.

The particulate matter including the sorbent and a quantity of absorbed mercury is directed from chamber 45 and/or through pipe 12 into an electrostatic fabric filter ("ESFF") 55 positioned downstream and in communication with chamber 45. ESFF 55 filters the combustion gas to remove the particulate matter including at least a portion of the mercury absorbed by the sorbent contained in the particulate matter. In one embodiment, ESFF 55 includes a plurality of cyclical pressure drops between a barrier medium, such as a cloth or fabric material. As combustion gas including particulate matter flows through the barrier medium, the particulate matter including the absorbed mercury is filtered from the combustion gas and a clean combustion gas exits the barrier medium. In a particular embodiment, ESFF 55 produces an electrostatic discharge between adjacent filter bags within ESFF 55. A negative charge developed within the region between the filter bags repels particles of particulate matter and allows the clean combustion gas to pass through the filter bags. In one embodiment, an interval between cleaning cycles (as required to clean the filter bags) is controlled to better utilize the sorbent and increase absorption of mercury. An increase in interval time between cleaning cycles results in an increased removal rate of mercury from the combustion gas and requires a reduced quantity of sorbent to remove the mercury. Further, the recirculated particulate matter includes a more porous dust cake that provides an increased surface area available for contact between the sorbent and mercury contained within the combustion gas. Thus, by controlling the cleaning cycle intervals the removal of mercury can be effectively adjusted for optimization and efficiency.

Figure 2:
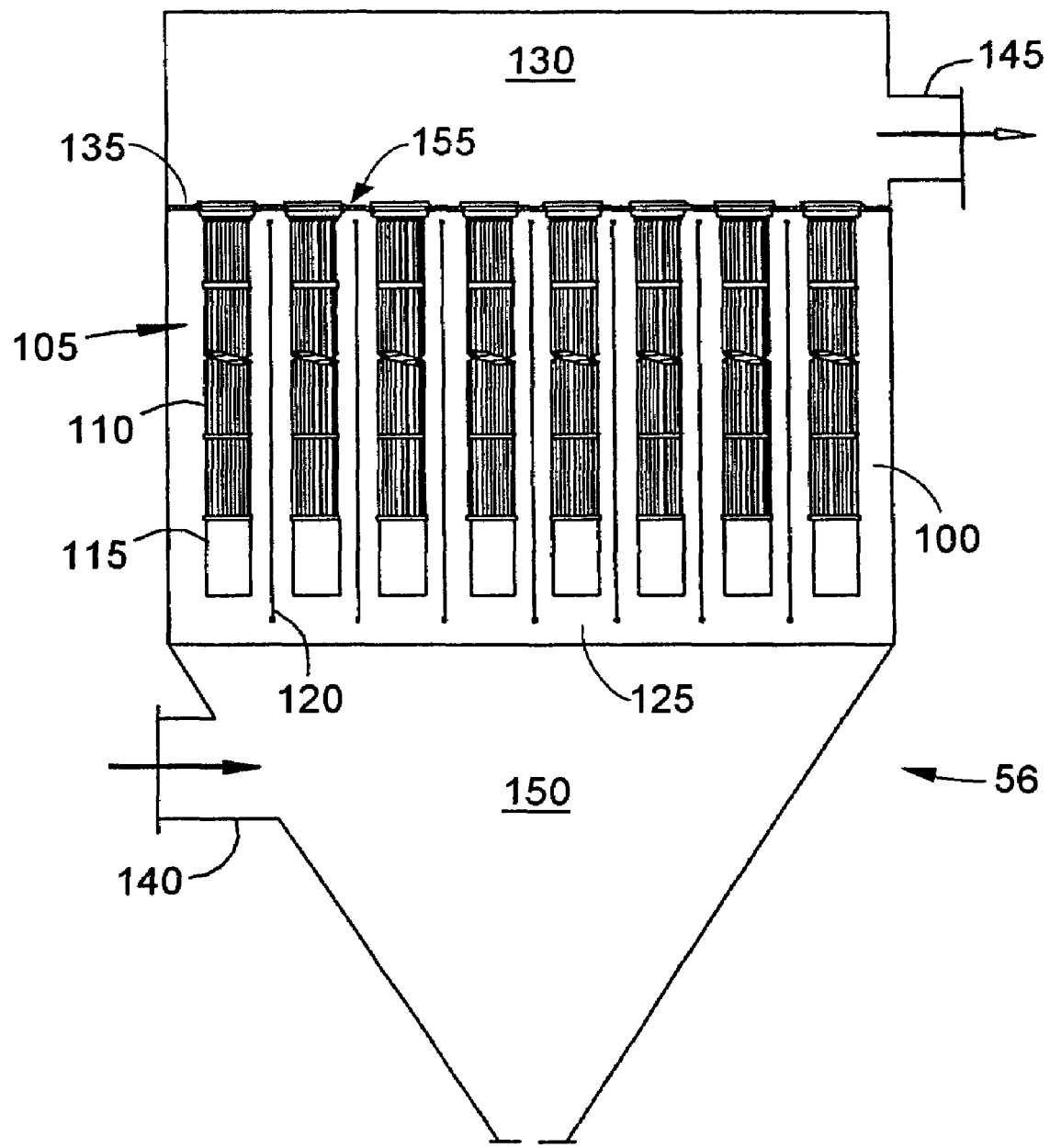
FIG. 2 is a schematic view of a baghouse, according to one embodiment of this invention.

In one embodiment, ESFF 55 includes a baghouse 56 positioned downstream from ESP 25, as shown in FIGS. 1 and 2. Referring further to FIG. 2, in this embodiment, baghouse 56 generally includes a housing 100 and a plurality of filter assemblies 105 positioned within housing 100. Each filter assembly 105 includes a filter element 110 and a pre-collector body component 115 extending below and attached to filter element 110. Baghouse 56 also includes a pre-collector discharge electrode 120. Combustion gas including particulate matter enters housing 100 and clean gas leaves. More specifically, the combustion gas passes adjacent to pre-collector body components 115 and discharge electrodes 120 which operate to remove at least a portion of the particulate matter in the combustion gas. Thereafter, the combustion gas passes through filter elements 110 where additional particulate matter is removed.

Housing 100 is divided into a first plenum 125 and a second plenum 130 by a tube sheet 135. Housing 100 also includes an inlet 140 that is in fluid communication with first plenum 125 and an outlet 145 that is in fluid communication with second plenum 130. An accumulation chamber 150 is located at the lower end of first plenum 125 and is defined by sloped walls. For example, accumulation chamber 150 has a V-shaped cross-section, as shown in FIG. 2.

Tube sheet 135 defines a plurality of apertures 155 that extends through tube sheet 135. FIG. 2 shows a number of filter assemblies 105 hanging from tube sheet 135 and extending through a corresponding aperture 155 defined in tube sheet 135. Each filter assembly 105 is supported at its upper end by tube sheet 135 and hangs downwardly in a substantially vertical direction.

At least one pre-collector discharge electrode 120 hangs vertically between filter assemblies 105. Discharge electrodes 120 may be positioned in a number of different locations within baghouse 56. For example, as shown in FIG. 2, discharge electrodes 120 may be positioned in rows and/or columns between and aligned with filter assemblies 105. Alternatively, discharge electrodes 105 are offset from filter assemblies 105 so that in effect, discharge electrodes 120 are positioned at a center point between four filter assemblies 105.

Filter element 110 includes a pleated filter media. The pleated filter media is formed in a substantially tubular shape with accordion folds at its inner and outer peripheries. The pleated filter media may be constructed of any suitable material for a desired filtering requirement. Pre-collector body component 115 is made of any suitable electrically conductive material or, alternatively, is coated by any suitable electrically conductive material. In one embodiment, pre-collector body component 115 is made of a suitable metal, such as conductive carbon steel. Discharge electrode 120 extends vertically and is spaced a short distance horizontally from pre-collector body component 115. Discharge electrode 120 is made from an electrically conductive material, such as a thin wire of stainless steel. In operation, discharge electrode 120 is electrically coupled to a voltage source, so that discharge electrode 120 obtains and maintains an electric potential or charge relative to pre-collector body component 115. In one embodiment, discharge electrode 120 is coupled to a line voltage through a transformer and rectifier (not shown) so that the discharge electrode is maintained at a voltage potential between negative 20,000 and negative 50,000 volts DC. Discharge electrode 120 may be entirely or partially shielded (i.e. only that length that corresponds to the length of the pre-collector body component 115) to lessen the likelihood that electrical current will arc between pre-collector body component 115 and discharge electrode 120.

For operation, discharge electrode 120 and pre-collector body component 115 have a difference in voltage potential. In one embodiment, as discussed above, discharge electrode 120 is coupled to a line voltage through a transformer and rectifier (not shown) so that discharge electrode 120 is maintained at a voltage potential between negative 20,000 and negative 50,000 volts DC and pre-collector body component 115 is grounded. It should be understood that discharge electrode 120 may be provided with a positive electrical potential or that the voltages may be reversed. Precautions, such as insulation and shielding, prevent electrical contact between discharge electrodes 120 and pre-collector body component 115, tube sheet 135, and/or housing 100.

In operation, particulate-laden combustion gas enters first plenum 125 through inlet 140. A fan (not shown) may be utilized to cause the combustion gas to move through baghouse 56. Within first plenum 125, the combustion gas passes adjacent to pre-collector body components 130 and the discharge electrodes 160. Pre-collector body components 130 and discharge electrodes 120 are separately coupled to a power source or to ground so that an electrical potential difference exists between these components. This electrical potential difference causes at least a portion of the particulate matter in the combustion gas to collect on pre-collector body components 115. No electrical field or potential is intentionally created across filter element 110.

Thereafter, the combustion gas passes through filter elements 110 and into an interior of filter assemblies 105, which will cause particulate matter carried by the combustion gas to separate by filter elements 110 and either accumulate on or in filter elements 110 or separate from the combustion gas and fall to lower portion 150 of first plenum 125. The cleaned combustion gas passes from the interior of filter assemblies 105 through aperture 155 in tube sheet 135 and into second plenum 130. Ultimately, the cleaned combustion gas will exit baghouse 56 through outlet 145.

As stated, pre-collector body components 115 and discharge electrodes 120 are separately coupled to a power source or to ground so that an electrical potential difference exists between these elements. Typically, particles have a negative charge and, therefore, will be repelled by a negatively charged item. Thus, in one embodiment, pre-collector discharge electrodes 120 are electrically coupled to a large negative voltage and pre-collector body components 115 are electrically coupled to ground, which should tend to cause particles to collect on pre-collector body components 115.

In one embodiment, a particulate matter collection efficiency of ESP 25 is reduced to about 80% to about 90%, compared to a normal ESP collection efficiency of about 98% to about 99.5%. With the ESP collection efficiency reduced to about 80% to about 90%, fly ash not collected within ESP 25 is collected within baghouse 56 to serve as a mercury sorbent. Thus, the introduction of an external sorbent typically required to achieve the normal ESP collection efficiency is not required, thereby conserving relatively expensive external sorbent. In a particular embodiment, an amount of particulate matter exiting ESP 25 is controlled by adjusting a power input to the electrical fields within ESP 25. When the power input to the electrical fields is reduced, a quantity of particulate matter including fly ash exiting the electrical fields increases. Increasing the quantity of particulate matter entering ESFF 55 and/or baghouse 56 increases the quantity of sorbent sites available within ESFF 55 and/or baghouse 56 for mercury removal. The slight increase in fly ash required to improve mercury removal is minimal compared to the total amount of uncontaminated fly ash available for subsequent sale, as discussed above. Moreover, because the high carbon fly ash has a lower resistivity, making its collection in ESP 25 more difficult, the quantity of fly ash that passes through ESP 25 after detuning may have a higher relative carbon content. Further, reducing the power input to ESP 25 will reduce the energy consumption of system 10. In particular embodiments, ESFF 55 and/or baghouse 56 is more effective than ESP 25 in removing mercury from the combustion gas and, thus, the fly ash collected within ESFF 55 and/or baghouse 56 serves as an effective mercury sorbent.

System 10 includes a recirculating device including a pipe 60 that provides communication between ESFF 55 and injector 50. Pipe 60 circulates the filtered particulate matter into injector 50 for recirculating the particulate matter, which may include recycled sorbent, into system 10, for example at chamber 45 as shown in FIG. 1. The filtered combustion gas is exhausted from system 10 through a suitable exhaust pipe or chimney 65 and the filtered particulate material is recirculated through injector 50 and into chamber 45.

In one embodiment, system 10 includes a control system 70 in operational control communication with the components of system 10 and configured to control a continuous removal of mercury from a supply of combustion gas. Control system 70 is configured to adjust an injection rate of $SO_3$ into the supply of combustion gas to oxidize elemental mercury within the combustion gas into ionic mercury based on an absorption rate of mercury by a particulate matter suspended within chamber 45. In a particular embodiment, the injection rate is adjusted based at least partially on the oxidation rate of mercury within SCR 15. If control system 70 determines that the oxidation rate within SCR 15 is sufficient, the injection rate will not be adjusted. However, if the oxidation rate is not sufficient, control system 70 is activated to adjust the injection rate accordingly.

Control system 70 is also configured to adjust an emission of fly ash from ESP 25 to control a quantity of absorption sites available downstream, such as within chamber 45, ESFF 55 and/or baghouse 56, to bond with and absorb mercury. In one embodiment, control system 70 includes a monitor 72, schematically shown in FIG. 1, is in operational control communication with ESP 25 to monitor an emission of fly ash from ESP 25 and control the quantity of absorption sites available downstream from ESP 25 for absorbing mercury contained within the combustion gas. In a particular embodiment, an amount of particulate matter exiting ESP 25 is controlled by adjusting the power input to the electrical fields within ESP 25. When the power input to the electrical fields is reduced, the amount of particulate matter including fly ash exiting the electrical fields increases. In one particular embodiment, with the ESP collection efficiency reduced to about 80% to about 90%, fly ash not collected within ESP 25 is collected within baghouse 56 to serve as a mercury sorbent. Thus, the introduction of an external sorbent typically required to achieve the normal ESP collection efficiency is not required, thereby conserving relatively expensive external sorbent. Further, reducing the power input to ESP 25 will reduce energy consumption.

In one embodiment, control system 70 controls the amount of atomized water injected into the supply of combustion gas to cool the supply of combustion gas before the supply of combustion gas is forced through venturi section 40. Further, control system 70 is configured to adjust a cleaning cycle interval within ESFF 55 to remove a substantial amount of mercury contained in the particulate matter. Control system 70 initiates recirculation of the particulate matter, which may contain recycled sorbent, into chamber 45 after the particulate matter is filtered within ESFF 55 and removed from the mercury.

In one embodiment, control system 70 meters an amount of sorbent needed for mercury removal at least partially based on a level of mercury removal within chamber 45, ESFF 55 and/or baghouse 56. By metering the amount of sorbent required to remove mercury, the need for externally-introduced sorbent is minimized, thereby contributing to the cost-effectiveness of system 10.

In one embodiment, a method for continuously removing mercury from a supply of combustion gas is provided. The method includes introducing a suitable quantity of $SO_3$ into the supply of combustion gas to oxidize at least a portion of elemental mercury within the supply of combustion gas into ionic mercury. A turbulent flow of combustion gas is produced to suspend particulate matter including fly ash contained in the supply of combustion gas. A substantial portion of the mercury is absorbed within the particulate matter. The supply of combustion gas is then filtered to remove the particulate matter from the mercury. In this embodiment, the introduction of $SO_3$ is controlled based on at least one of an oxidation rate of mercury and an absorption rate of mercury. Further, a quantity of absorption sites available within the system for mercury absorption is controlled by monitoring an emission of fly ash from the electrostatic precipitator.

In one embodiment, the emission of fly ash from ESP 25 is monitored to control the quantity of absorption sites available downstream from ESP 25 for absorbing mercury contained within the combustion gas. In a particular embodiment, an amount of particulate matter exiting ESP 25 is controlled by adjusting the power input to the electrical fields within ESP 25. When the power input to the electrical fields is reduced, the amount of particulate matter including fly ash exiting the electrical fields increases. In one particular embodiment, with the ESP collection efficiency reduced to about 80% to about 90%, fly ash not collected within ESP 25 is collected within baghouse 56 to serve as a mercury sorbent.

In an alternative embodiment, a turbulent flow of the supply of combustion gas is produced within chamber 45. The supply of combustion gas is conditioned before producing the turbulent flow. In one embodiment, $SO_3$ is introduced into the combustion gas to oxidize at least a portion of the elemental mercury contained within the combustion gas into ionic mercury before producing the turbulent flow of the combustion gas. Additionally, the combustion gas may be cooled. In one embodiment, the combustion gas flows through venturi section 40 to direct the combustion gas into chamber 45 in a turbulent path. A particulate matter is mixed with the turbulent flow of combustion gas within chamber 45 to distribute the particulate matter uniformly throughout chamber 45. In a particular embodiment, the particulate matter includes at least one externally-introduced sorbent, such as a quantity of activated carbon and/or a quantity of lime, that is introduced into chamber 45 in a dry form.

Within chamber 45, the particulate matter absorbs the mercury within the combustion gas. The particulate matter including the sorbent and the quantity of absorbed mercury is filtered to remove the particulate matter including the sorbent from the mercury. With the undesirable mercury removed from the particulate matter, the particulate matter is recirculated into chamber 45. In one embodiment, a suitable quantity of fly ash is mixed with the particulate matter recirculated into chamber 45. The filtered combustion gas is released into the atmosphere through an exhaust pipe or chimney.

The above-described method and system facilitates the continuous removal of mercury from a supply of combustion gas in a cost-effective and reliable manner. More specifically, the method and system of the present invention monitors and adjusts the introduction of materials, such as $SO_3$ and/or sorbent for example, based on an absorption rate of mercury within the system. As a result, the method and system is cost-effective and reliable.

Exemplary embodiments of a method and system for continuously removing mercury from a supply of combustion gas are described above in detail. The method and system are not limited to the specific embodiments described herein, but rather, steps of the method and/or components of the system may be utilized independently and separately from other steps and/or components described herein. Further, the described method steps and/or system components can also be defined in, or used in combination with, other methods and/or systems, and are not limited to practice with only the method and system as described herein.

While the invention has been described in terms of various specific embodiments, those skilled in the art will recognize that the invention can be practiced with modification within the spirit and scope of the claims.

What is claimed is:

1. A method for continuously removing mercury from a supply of combustion gas, the method comprises:
    introducing SO3 into the supply of combustion gas to oxidize at least a portion of elemental mercury within the supply of combustion gas into ionic mercury;
    producing a turbulent flow of combustion gas to suspend particulate matter including fly ash contained in the supply of combustion gas;
    absorbing a substantial portion of the mercury within the particulate matter;
    filtering the supply of combustion gas to remove the particulate matter from the mercury; and
    controlling the introduction of SO3 into the combustion gas based at least partially on at least one of an oxidation rate of mercury and an absorption rate of mercury.

2. A method in accordance with claim 1 further comprising recirculating the particulate matter into the combustion gas after removing the particulate matter from the mercury.

3. A method in accordance with claim 2 wherein recirculating the particulate matter further comprises controlling a mixing of a quantity of at least one sorbent with the particulate matter.

4. A method in accordance with claim 1 wherein producing a turbulent flow of combustion gas uniformly distributes the particulate matter including a quantity of at least one sorbent.

5. A method in accordance with claim 1 further comprising mixing a particulate matter including a quantity of at least one externally introduced sorbent with the turbulent flow of combustion gas to suspend the particulate matter.

6. A method in accordance with claim 1 wherein filtering the supply of combustion gas further comprises creating a fluidized bed of the particulate matter within an electrostatic fabric filter to filter the supply of combustion gas.

7. A method in accordance with claim 1 further comprising cooling the supply of combustion gas before producing the turbulent flow of combustion gas.

8. A method in accordance with claim 1 further comprising introducing at least one external sorbent into the turbulent flow of combustion gas.

9. A method in accordance with claim 1 further comprising exhausting a filtered combustion gas into the atmosphere.

10. A control system for controlling a continuous removal of mercury from a supply of combustion gas, said control system configured to:
    adjust an injection rate of SO3 into the supply of combustion gas to oxidize at least a portion of elemental mercury within the supply of combustion gas into ionic mercury based on an absorption rate of mercury by a particulate matter suspended in the combustion gas.

11. A control system in accordance with claim 10 further configured to recirculate the particulate matter into the combustion gas after filtering the particulate matter within an electrostatic fabric filter.

12. A control system in accordance with claim 10 further configured to adjust a quantity of water injected into the supply of combustion gas to cool the supply of combustion gas.

13. A control system in accordance with claim 10 further configured to meter a quantity of sorbent within the particulate matter based on a level of mercury removal from the supply of combustion gas.

14. A system for continuously removing mercury from a supply of combustion gas, said system comprising:
    a combustion gas conditioning system introducing a quantity of SO3 into the supply of combustion gas;
    an electrostatic precipitator in communication with said combustion gas conditioning system, said electrostatic precipitator adjusting an emission of fly ash from said electrostatic precipitator to control a quantity of mercury absorption sites available downstream;
    a cooling device in communication with said electrostatic precipitator, said cooling device cooling the supply of combustion gas as the supply of combustion gas flows through said cooling device;
    a section producing a turbulent flow of combustion gas;
    an injector controllably injecting a quantity of external sorbent into the turbulent flow of combustion gas, the turbulent flow of combustion gas uniformly distributing a particulate matter including the quantity of sorbent;
    an electrostatic fabric filter positioned downstream of said injector, said electrostatic fabric filter filtering the particulate matter removed from the turbulent flow of combustion gas and removing the particulate matter and the quantity of sorbent from a quantity of mercury absorbed in the quantity of sorbent; and
    a recirculating device providing communication between said electrostatic fabric filter and said injector, said recirculating device circulating the filtered particulate matter into said injector.

* * * * *